(12) United States Patent
     Sun

(10) Patent No.: US 11,243,653 B2
(45) Date of Patent: Feb. 8, 2022

(54) METHOD FOR DISPLAY CONTROL AND MOBILE TERMINAL

(71) Applicant: VIVO MOBILE COMMUNICATION CO., LTD., Guangdong (CN)

(72) Inventor: Han Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/968,228

(22) PCT Filed: Jan. 29, 2019

(86) PCT No.: PCT/CN2019/073666
     § 371 (c)(1),
     (2) Date: Aug. 7, 2020

(87) PCT Pub. No.: WO2019/154181
     PCT Pub. Date: Aug. 15, 2019

(65) Prior Publication Data
     US 2021/0034223 A1    Feb. 4, 2021

(30) Foreign Application Priority Data

Feb. 9, 2018   (CN) .......................... 201810134208.0

(51) Int. Cl.
     *G06F 3/0481*      (2013.01)
     *G06F 3/0484*      (2013.01)
                        (Continued)

(52) U.S. Cl.
     CPC ........ *G06F 3/0481* (2013.01); *G06F 3/04817* (2013.01); *G06F 3/04845* (2013.01);
                        (Continued)

(58) Field of Classification Search
     None
     See application file for complete search history.

(56) References Cited

U.S. PATENT DOCUMENTS

2006/0218499 A1*  9/2006  Matthews ............. G06F 16/313
                                                          715/765
2015/0031417 A1*  1/2015  Lee ..................... G06F 3/04886
                                                          455/566
                        (Continued)

FOREIGN PATENT DOCUMENTS

CN       201742451 U     2/2011
CN       104503725 A     4/2015
                        (Continued)

OTHER PUBLICATIONS

International Search Report and Written Opinion dated Aug. 20, 2020 issued in PCT/CN2019/073666.
                        (Continued)

*Primary Examiner* — Ryan Barrett
(74) *Attorney, Agent, or Firm* — Gearhart Law LLC; David Postolski, Esq.

(57) ABSTRACT

A method for display control and a mobile terminal are provided. The method for display control includes: receiving a first operation inputted by a user; displaying, in a third screen region, an icon corresponding to a notification message, content of a notification message, or an application icon of at least one target application, in response to the first operation; where a display screen of the mobile terminal includes a first screen region, a second screen region, and the third screen region which is between the first screen region and the second screen region.

18 Claims, 3 Drawing Sheets

(51) Int. Cl.
  *G09G 5/14* (2006.01)
  *G06F 3/147* (2006.01)
  *G06F 3/041* (2006.01)

(52) U.S. Cl.
  CPC ............... *G06F 3/147* (2013.01); *G09G 5/14* (2013.01); *G06F 3/0416* (2013.01); *G06F 2203/04803* (2013.01); *G09G 2340/04* (2013.01); *G09G 2354/00* (2013.01); *G09G 2380/02* (2013.01)

(56) References Cited

U.S. PATENT DOCUMENTS

| | | | | |
|---|---|---|---|---|
| 2016/0105542 | A1* | 4/2016 | Lee | G06F 3/04886 455/566 |
| 2016/0132074 | A1* | 5/2016 | Kim | G06F 1/1652 715/769 |
| 2016/0188002 | A1 | 6/2016 | Xu | |
| 2016/0191429 | A1* | 6/2016 | Lee | G06F 3/04842 715/752 |
| 2016/0246558 | A1* | 8/2016 | Prushinskiy | G06F 1/3287 |
| 2017/0060380 | A1* | 3/2017 | Huang | G06F 3/04845 |
| 2017/0206863 | A1* | 7/2017 | An | G06F 3/0481 |
| 2017/0357113 | A1* | 12/2017 | Yamazaki | H01L 31/14 |
| 2018/0018929 | A1* | 1/2018 | Xun | G06F 1/1626 |
| 2018/0330696 | A1 | 11/2018 | Cui | |
| 2019/0000578 | A1* | 1/2019 | Yu | A61B 34/10 |

FOREIGN PATENT DOCUMENTS

| | | |
|---|---|---|
| CN | 104572004 A | 4/2015 |
| CN | 105452983 A | 3/2016 |
| CN | 105528034 A | 4/2016 |
| CN | 106504645 A | 3/2017 |
| CN | 107589903 A | 1/2018 |
| CN | 107643847 A | 1/2018 |
| CN | 108255378 A | 7/2018 |
| KR | 101691927 B1 | 1/2017 |

OTHER PUBLICATIONS

Search Report dated Nov. 19, 2018 issued in Chinese Application No. 201810134208.0.

* cited by examiner

METHOD FOR DISPLAY CONTROL AND MOBILE TERMINAL

CROSS-REFERENCE TO RELATED APPLICATION

This application is the U.S. national phase of PCT Application No. PCT/CN2019/073666 filed on Jan. 29, 2019, which claims a priority to Chinese Patent Application No. 201810134208.0 filed on Feb. 9, 2018, the disclosures of which are incorporated in their entirety by reference herein.

TECHNICAL FIELD

The present disclosure relates to the field of communication technology, and in particular to a method for display control and a mobile terminal.

BACKGROUND

With the development of technology, more and more content can be displayed by a display screen of a mobile terminal. However, due to the limited display region of the display screen of the mobile terminal, the content that can be displayed on the display screen of the mobile terminal is limited. Therefore, it is needed to fully develop display manners that can be adopted by the display screen of the mobile terminal.

In addition, with the development of flexible screens, flexible screens can bring infinite possibilities for the display of mobile terminals based on their unique foldability, for example, enabling the mobile terminals to have larger screens, which resulting in more novel sensory and visual experiences. At present, for a mobile terminal with a flexible screen, the screen of the mobile terminal is usually divided into several parts for folding, so that the flexible screen can be partitioned by a bending region, which makes the mobile terminal be able to have a small size for easy carrying, and also makes the mobile terminal be able to have a large size for easy utilization. However, there are still many exploration directions in display of the flexible screens, and the flexible screens are not fully utilized for display at present.

In summary, there is a problem in the related technologies that the display screen of the mobile terminal is not fully utilized for display.

SUMMARY

The embodiments of the present disclosure provide a method for display control and a mobile terminal, to solve the problem in the related technologies that a display screen of a mobile terminal is not fully utilized for display.

In order to solve the above technical problem, in a first aspect, embodiments of the present disclosure provide a method for display control, applied to a mobile terminal, including:

receiving a first operation inputted by a user; and displaying, in a third screen region, an icon corresponding to a notification message, content of a notification message, or an application icon of at least one target application, in response to the first operation;

where a display screen of the mobile terminal includes a first screen region, a second screen region, and the third screen region which is between the first screen region and the second screen region.

In a second aspect, embodiments of the present disclosure provide a mobile terminal, including:

a first receiving module, configured to receive a first operation inputted by a user; and a first display module, configured to display, in a third screen region, an icon corresponding to a notification message, content of a notification message, or an application icon of at least one target application, in response to the first operation;

where a display screen of the mobile terminal includes a first screen region, a second screen region, and the third screen region which is between the first screen region and the second screen region.

In a third aspect, embodiments of the present disclosure provide a mobile terminal, including a processor, a memory, and a program stored in the memory and executable by the processor, and the program, when being executed by the processor, performs the steps of the method for display control.

In a fourth aspect, embodiments of the present disclosure provide a computer readable storage medium, having a program stored thereon, and the program, when being executed by a processor, performs the steps of the method for display control.

In the embodiments of the present disclosure, in a case that the first operation inputted by the user is received, the icon corresponding to the notification message, the content of the notification message, or the application icon of the at least one target application is displayed in the third screen region of the display screen. In this way, the third screen region between the first screen region and the second screen region can be fully utilized for display and the display region of the display screen of the mobile terminal is enlarged, which solves the problem in the related technologies that a display screen of a mobile terminal is not fully utilized for display.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

Figure 1:
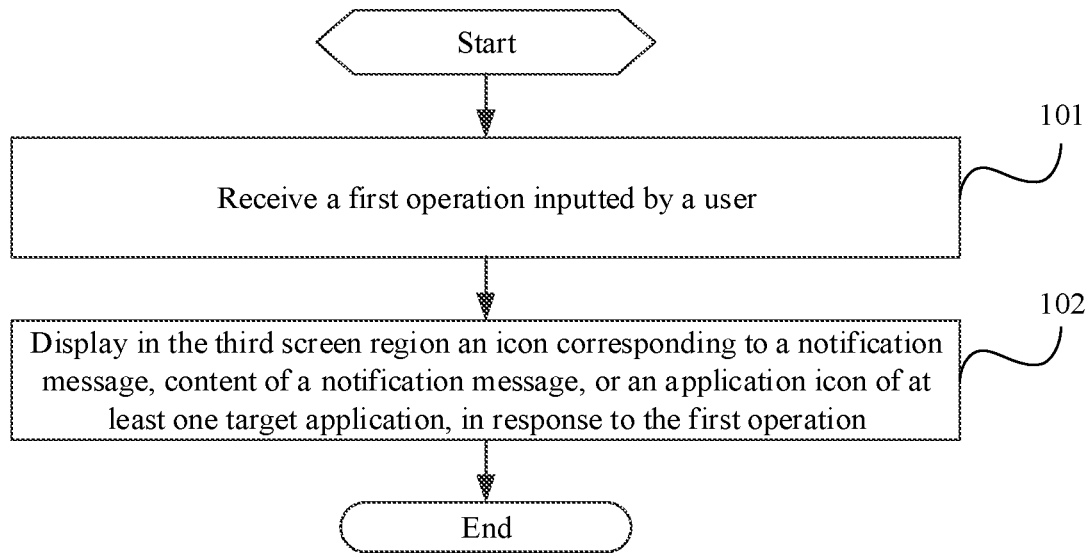
FIG. 1 is a flow chart of steps of a method for display control according to embodiments of the present disclosure.

Reference is made to FIG. 1, which is a flowchart of steps of a method for display control in embodiments of the present disclosure. The method for display control includes steps 101 and 102.

Step 101 includes: receiving a first operation inputted by a user.

Specifically, a display screen of the mobile terminal may include a first screen region, a second screen region, and a third screen region which is between the first screen region and the second screen region.

In this step, specifically, in a case of receiving the first operation inputted by the user, the first operation inputted by the user, which indicates performing display in the first screen region and/or the second screen region, may be received. In this way, the mobile terminal can control the display manner of the display screen of the mobile terminal according to the received first operation.

Step 102 includes: displaying, in the third screen region, an icon corresponding to a notification message, content of a notification message, or an application icon of at least one target application, in response to the first operation.

In this step, specifically, in a case that the first operation inputted by the user is received, the icon corresponding to the notification message, the content of the notification message, or the application icon of the at least one target application may be displayed in the third screen region in response to the first operation. As a result, the icon corresponding to the notification message, the content of the notification message, or the application icon of the at least one target application can be displayed in the third screen region between the first screen region and the second screen region, which achieves full utilization of the third screen region for display. In this case, when the mobile terminal displays in the first screen region and/or the second screen region, a situation where the third screen region between the first screen region and the second screen region cannot be fully utilized for display is avoided, realizing full display of the display screen. Descriptions are provided hereinafter with examples.

Figure 2:
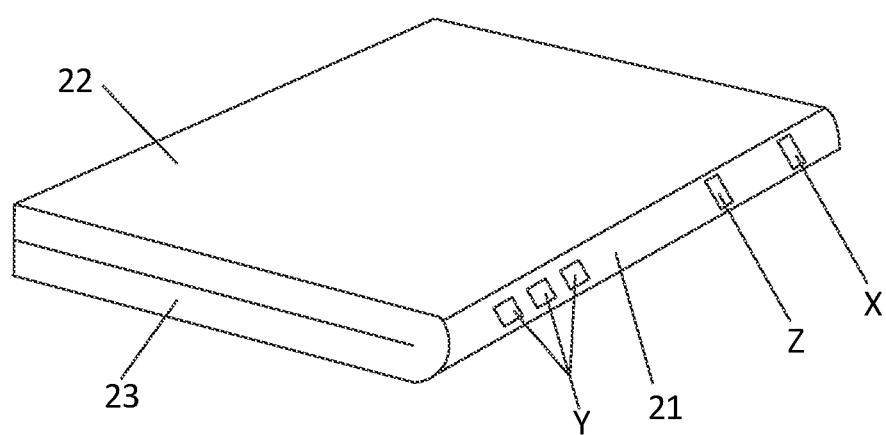
FIG. 2 is a schematic diagram of a third screen region being a bending region of a flexible screen according to embodiments of the present disclosure.

For example, as shown in FIG. 2, in a case that the screen of the mobile terminal is a flexible screen and the third screen region is the bending region 21 of the flexible screen, the icon X corresponding to the notification message, the content of the notification message, or the application icons Y of the at least one target application are displayed in the bending region 21. In this way, the bending region of the flexible screen can be fully utilized for display, avoiding the problem that the bending region of the flexible screen cannot be used for display when the flexible screen is bent, enlarging the display region of the flexible screen when the flexible screen is bent, and achieving full utilization of the display screen.

Figure 3:
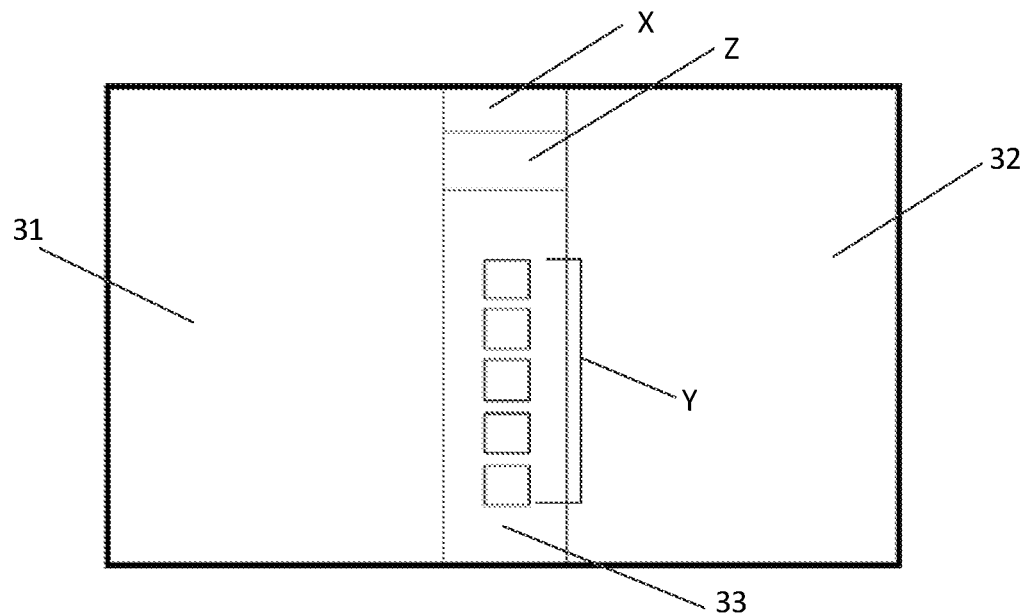
FIG. 3 is a schematic diagram of displaying in a third screen region according to embodiments of the present disclosure

For another example, as shown in FIG. 3, in a case that the first screen region 31 and the second screen region 32 of the display screen of the mobile terminal are respectively used for display, that is, split-screen display being adopted by the display screen, the icon X corresponding to the notification message, the content of the notification message, or the application icons Y of at least one target application is displayed in the third screen region 33 between the first screen region 31 and the second screen region 32. In this way, the third screen region 33 between the first screen region 31 and the second screen region 32 can be fully utilized for display, which avoids the problem that the screen region between the two screen regions of split-screen display cannot be used for display when the display screen adopts split-screen display, enlarges the display region of the display screen during split-screen display, and achieves full utilization of the display screen of the mobile terminal for display.

The content of the notification message may be a notification message of an application, where the notification message of the application is received by the mobile terminal. In addition, the mobile terminal may preset an application icon for the notification message, and in a case that the user inputs an operation on the application icon of the notification message, the specific content of the notification message can be viewed.

In the displaying in the third screen region the application icon of the at least one target application in response to the first operation, an application icon of at least one application which is running in the background is displayed in the third screen region in response to the first operation; and/or, an application icon of at least one application whose duration of running in the foreground is longer than a preset duration is displayed in the third screen region in response to the first operation; and/or, an application icon of at least one application whose number of running in the foreground is greater than a preset number of threshold is displayed in the third screen region in response to the first operation. In this way, in a case that the application icon of at least one target application is displayed in the third screen region, the user can view in the third screen region an application icon of an application that has been started in the background of the mobile terminal, or can view an application icon of an application which has run in the foreground for a duration longer than a preset duration, or can view an application icon of an application which has run in the foreground for a number of times greater than a preset number of threshold. As a result, the third screen region can be fully utilized for display, the problem that the user needs to return to the desktop of the mobile terminal to search for a to-be-started application when the user wants to start an application running in the background or a frequently used application is avoided, which facilitates the user's operation.

Specifically, terminal information may be displayed in the third screen region in response to the first operation, where the terminal information includes at least one of the following pieces of information: remaining power information, signal strength information, or time information. For example, as shown in FIG. 2, the terminal information Z is displayed in the bending region 21. For another example, as shown in FIG. 3, the terminal information Z is displayed in the third screen region 33 between the first screen region 31 and the second screen region 32. In this way, multiple types of contents can be displayed in the third screen region, thereby achieving full utilization of the display screen of the mobile terminal and increasing display resources of the mobile terminal. In addition, in a case that the third screen region is the bending region of the flexible screen, or in a case that the third screen region is a separation region for separating the first screen region and the second screen region to enable the first screen region and the second screen region to adopt split-screen display, the terminal information is prevented from occupying the space in the first screen region or the second screen region, so that the display region of running interfaces can be enlarged in a case that the running interfaces of applications are displayed via the first screen region and the second screen region, which provides a better visual experience for the user.

In the embodiments of the present disclosure, the icon corresponding to the notification message, the content of the notification message, or the application icon of the at least one target application is displayed in the third screen region between the first screen region and the second screen region in response to the first operation inputted by the user. In this way, the third screen region between the first screen region and the second screen region can be fully utilized for display, which increases the display resources of the mobile terminal.

In addition, in a case that the application icon of the at least one target application is displayed in the third screen region, an operation mode for the application icon of the at least one target application may be set to facilitate the user's operation. Descriptions are respectively provided hereinafter.

In an implementation, after the application icon of the at least one target application is displayed in the third screen region, detection of a second operation on a first target application icon which is displayed in the third screen region inputted by the user is performed; it is detected whether a running interface of an application is displayed in a target screen region, in a case that it is detected that the user drags the first target application icon into the target screen region.

A target running interface of an application corresponding to the first target application icon is displayed in the target screen region, in a case that it is detected that the running interface of the application is not displayed in the target screen region; the running interface is closed, an application icon of the application corresponding to the running interface is displayed in the third screen region, and the target running interface of the application corresponding to the first target application icon is displayed in the target screen region, in a case that it is detected that the running interface of the application is displayed in the target screen region; where the target screen region is the first screen region or the second screen region.

It should be noted that the first target application icon may be one of the application icons displayed in the third screen region. The first target application icon may be an application icon of a target application running in the background, or an application icon of a target application in a closed state.

In this way, in a case that it is detected that the user drags the first target application icon into the target region, and when the running interface of the application is not displayed in the target screen region, the target running interface of the application corresponding to the first target application icon is directly displayed in the target screen region. As a result, the user can directly operate in the third screen region the first target application icon when the user needs to run in the foreground the application corresponding to the first target application icon, avoiding operation steps of returning to the desktop of the mobile terminal to search for the first target application icon, and providing more operation manners for the user to start the application, which facilitates the user's operation.

On the premise that the running interface of the application is displayed in the target screen region, the running interface in the target screen region is closed, the application icon of the application corresponding to the running interface is displayed in the third screen region, and the target running interface of the application corresponding to the first target application icon is displayed in the target screen region. In this way, switching of the running interface displayed in the target screen region is realized, that is, interactive startup and switch between the application running in the foreground of the mobile terminal and the application corresponding to the target application icon displayed in the third screen region are realized, which improves the operability of the mobile terminal.

For example, as shown in FIG. 2, it is assumed that the target screen region is the first screen region 22 and a running interface of an application, e.g., a video player, is displayed in the first screen region 22, and in a case that it is detected by the mobile terminal that the user drags the first target application icon in the third screen region 21 into in the first screen region 22, the running interface of the video player displayed in the first screen region 22 may be closed, the target running interface of the application corresponding to the first target application icon is displayed in the first screen region 22, and the application icon of the video player is displayed in the third screen region 21. In a case that the target screen region is the second screen region 23, the operation process is the same as that of the case where the target screen region is the first screen region 22. In this way, the user can switch running interfaces in the target screen region based on needs, which facilitates the user's operation.

For another example, as shown in FIG. 3, it is assumed that the target screen region is the first screen region 31 and a running interface of an application, e.g., a video player, is displayed in the first screen region 31, and in a case that it is detected by the mobile terminal that the user drags the first target application icon in the third screen region 33 into the first screen region 31, the running interface of the video player displayed in the first screen region 31 may be closed, the target running interface of the application corresponding to the first target application icon is displayed in the first screen region 31, and the application icon of the video player is displayed in the third screen region 33. In a case that the target screen region is the second screen region 32, the operation process is the same as that of the case where the target screen region is the first screen region 31. In this way, the user can switch running interfaces in the target screen region based on needs, which facilitates the user's operation.

In another implementation, after the application icon of the at least one target application is displayed in the third screen region, detection of a third operation on a second target application icon which is displayed in the third screen region inputted by the user is performed; an application corresponding to the second target application icon is closed, in a case that it is detected that a speed at which the user drags the second target application icon or a direction in which the user drags the second target application icon meets a preset condition.

It should be noted that the second target application icon is one of the application icons displayed in the third screen region. The second target application icon may be an application icon of a target application running in the foreground, or an application icon of a target application running in the background.

In this way, in a case that the user needs to close an application in a running state (including running in the foreground and running in the background), the user may directly operate the application icon of the target application in the running state displayed in the third screen region, which simplifies the operation process of closing the application for the user, realizes the simple management of the target application corresponding to the application icon displayed in the third screen region.

In another implementation, after the application icon of the at least one target application is displayed in the third screen region, a sliding operation in a preset direction at a preset speed is received, where the sliding operation is inputted by the user in the third screen region; the application corresponding to the application icon displayed in the third screen region is closed according to the sliding operation.

It should be noted that the closed application may be all applications running in the foreground and all applications running in the background among the target applications corresponding to the application icons in the third screen region.

In this way, the user inputs the sliding operation in the preset direction at the preset speed, so that the mobile terminal can close all applications which are in the running state and are corresponding to the application icons displayed in the third screen region, thereby avoiding the user from repeating the operation step of closing a single application that needs to be stopped, which facilitates the user's operation and realizes the simple management of the applications corresponding to the application icons displayed in the third screen region.

In the embodiments of the present disclosure, the icon corresponding to the notification message, the content of the notification message, or the application icon of the at least one target application is displayed in the third screen region between the first screen region and the second screen region in response to the first operation inputted by the user. In this way, the third screen region between the first screen region and the second screen region can be fully utilized for display, which increases the display resources of the mobile terminal.

Figure 4:
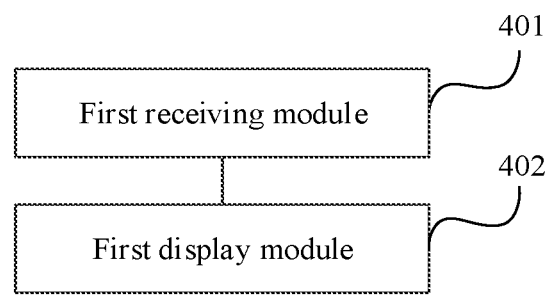
FIG. 4 is a block diagram of a mobile terminal according to embodiments of the present disclosure.

In addition, as shown in FIG. 4, embodiments of the present disclosure provide a mobile terminal, including:

a first receiving module 401, configured to receive a first operation inputted by a user; and a first display module 402, configured to display, in a third screen region, an icon corresponding to a notification message, content of a notification message, or an application icon of at least one target application, in response to the first operation received by the first receiving module 401;

a display screen of the mobile terminal includes a first screen region, a second screen region, and the third screen region which is between the first screen region and the second screen region.

In the embodiments of the present disclosure, the first operation inputted by the user is received via the first receiving module 401, and the icon corresponding to the notification message, the content of the notification message, or the application icon of the at least one target application is displayed in the third screen region between the first screen region and the second screen region via the first display module 402. In this way, the third screen region between the first screen region and the second screen region can be fully utilized for display, which increases the display resources of the mobile terminal.

Optionally, the receiving module is configured to receive the first operation inputted by the user, where the first operation indicates performing display in the first screen region and/or the second screen region.

Optionally, the first display module includes:

a first display unit, configured to display, in the third screen region, an application icon of at least one application which is running in the background, in response to the first operation; and/or, a second display unit, configured to display, in the third screen region, an application icon of at least one application whose duration of running in the foreground is longer than a preset duration, in response to the first operation; and/or, a third display unit, configured to display, in the third screen region, an application icon of at least one application whose number of running in the foreground is greater than a preset number of threshold, in response to the first operation.

Optionally, the mobile terminal further includes:

a second display module, configured to display terminal information in the third screen region in response to the first operation, where the terminal information comprises at least one of the following pieces of information: remaining power information, signal strength information, or time information.

Optionally, the mobile terminal further includes:

a first detection module, configured to detect a second operation on a first target application icon which is displayed in the third screen region inputted by the user;

a second detection module, configured to detect whether a running interface of an application is displayed in a target screen region, in a case that it is detected that the user drags the first target application icon into the target screen region;

a first processing module, configured to display, in the target screen region, a target running interface of an application corresponding to the first target application icon, in a case that it is detected that the running interface of the application is not displayed in the target screen region; and a second processing module, configured to close the running interface, display in the third screen region an application icon of the application corresponding to the running interface, and display in the target screen region the target running interface of the application corresponding to the first target application icon, in a case that it is detected that the running interface of the application is displayed in the target screen region;

the target screen region is the first screen region or the second screen region.

Optionally, the mobile terminal further includes:

a third detection module, configured to detect a third operation on a second target application icon which is displayed in the third screen region inputted by the user; and a third processing module, configured to close an application corresponding to the second target application icon, in a case that it is detected that a speed at which the user drags the second target application icon or a direction in which the user drags the second target application icon meets a preset condition.

Optionally, the mobile terminal further includes:

a second receiving module, configured to receive a sliding operation in a preset direction at a preset speed which is inputted by the user in the third screen region; and a fourth processing module, configured to close an application corresponding to the application icon displayed in the third screen region, according to the sliding operation.

In mobile terminal according to the embodiments of the present disclosure, the icon corresponding to the notification message, the content of the notification message, or the application icon of the at least one target application is displayed in the third screen region between the first screen region and the second screen region in response to the first operation inputted by the user. In this way, the third screen region between the first screen region and the second screen region can be fully utilized for display, which increases the display resources of the mobile terminal.

The mobile terminal provided by the embodiments of the present disclosure can implement each step of the above method embodiments and achieve the same beneficial effects, which is not described in detail herein.

Figure 5:
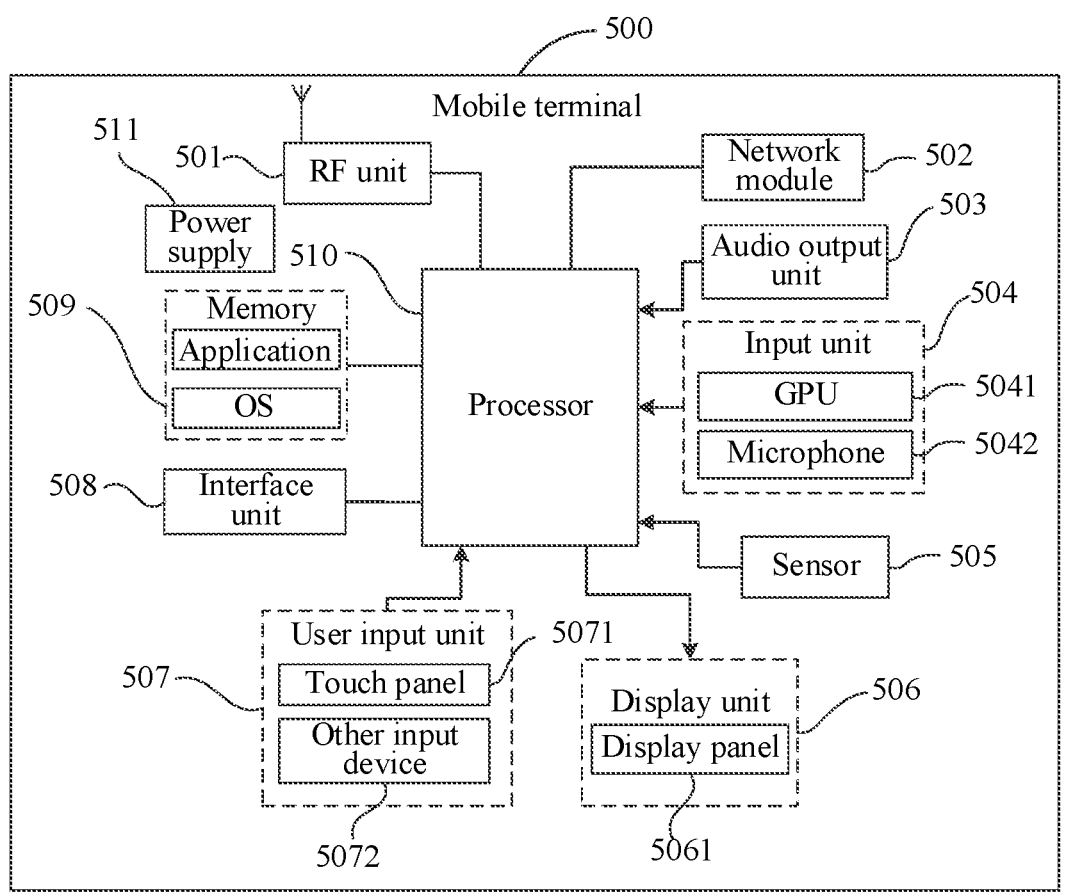
FIG. 5 is a structural block diagram of a mobile terminal according to embodiments of the present disclosure.

In addition, FIG. 5 is a schematic diagram of a hardware structure of a mobile terminal for implementing various embodiments of the present disclosure. The mobile terminal 500 includes, but is not limited to, a radio frequency unit 501, a network module 502, an audio output unit 503, an input unit 504, a sensor 505, a display unit 506, a user input unit 507, an interface unit 508, a memory 509, a processor 510, and a power supply 511, etc. Those skilled in the art can understand that the structure of the mobile terminal shown in FIG. 5 does not constitute a limitation to the mobile terminal, and the mobile terminal may include more or fewer components than those shown in the figure, or have some components combined, or use a different arrangement of the components. In the embodiments of the present disclosure, the mobile terminal includes, but is not limited to, a mobile phone, a tablet computer, a notebook computer, a palmtop computer, a vehicle-mounted terminal, a wearable device, a pedometer, or the like.

The processor 510 is configured to receive a first operation inputted by a user; and display, in a third screen region, an icon corresponding to a notification message, content of a notification message, or an application icon of at least one target application, in response to the first operation; where a display screen of the mobile terminal includes a first screen region, a second screen region, and the third screen region which is between the first screen region and the second screen region.

In mobile terminal according to the embodiments of the present disclosure, the icon corresponding to the notification message, the content of the notification message, or the application icon of the at least one target application is displayed in the third screen region between the first screen region and the second screen region in response to the first operation inputted by the user. In this way, the third screen region between the first screen region and the second screen region can be fully utilized for display, which increases the display resources of the mobile terminal.

It should be understood that, in the embodiments of the present disclosure, the radio frequency unit 501 may be configured to receive and send information, or to receive and send signals in a call. Specifically, the radio frequency unit 501 delivers the downlink data received from a base station to the processor 510; and transmits the uplink data to the base station. Generally, the radio frequency unit 501 includes, but is not limited to, an antenna, at least one amplifier, a transceiver, a coupler, a low noise amplifier, a duplexer, or the like. In addition, the radio frequency unit 501 may communicate with a network or other devices via a wireless communication system.

The mobile terminal provides users with wireless broadband Internet access via the network module 502, such as helping users send and receive emails, browse web pages and access streaming media.

The audio output unit 503 may convert audio data received by the radio frequency unit 501 or the network module 502 or stored in the memory 509 into audio signals and output them as sound. Moreover, the audio output unit 503 may provide audio output (for example, call signal reception sound, message reception sound, etc.) related to a specific function performed by the mobile terminal 500. The audio output unit 503 includes a speaker, a buzzer, a receiver, or the like.

The input unit 504 is configured to receive audio or video signals. The input unit 504 may include a graphics processing unit (GPU) 5041 and a microphone 5042. The graphics processor 5041 is configured to process image data of still pictures or videos obtained via an image capture device (such as a camera) in an image capture mode or a video capture mode. The processed image frames may be displayed in the display unit 506. The image frames processed by the graphics processor 5041 may be stored in the memory 509 (or other storage medium) or transmitted via the radio frequency unit 501 or the network module 502. The microphone 5042 may receive sound, and may process the sound into audio data. The processed audio data may be converted into a format for outputting that can be transmitted via the radio frequency unit 501 to a mobile communication base station in the case of a telephone call mode.

The mobile terminal 500 further includes at least one sensor 505, such as an optical sensor, a motion sensor, or other sensors. Specifically, the optical sensor includes an ambient light sensor and a proximity sensor. The ambient light sensor may adjust brightness of the display panel 5061 according to the brightness of the ambient light, and the proximity sensor may close the display panel 5061 and/or backlight when the mobile terminal 500 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the mobile terminal (such as switching of horizontal and vertical screen, a correlated game, magnetometer pose calibration), a function about vibration recognition (such as pedometer, tapping). The sensor 505 may include a fingerprint sensor, a pressure sensor, an iris sensor, a molecular sensor, a gyroscope, a barometer, a hygrometer, a thermometer, an infrared sensor, or the like, which are not described herein.

The display unit 506 is configured to display information inputted by the user or information provided for the user. The display unit 506 may include a display panel 5061. The display panel 5061 may be configured in the form of a liquid crystal display (LCD), an organic light-emitting diode (OLED), or the like.

The user input unit 507 may be configured to receive inputted numeric or character information, and generate key signal inputs related to user settings and function control of the mobile terminal. Specifically, the user input unit 507 includes a touch panel 5071 and other input device 5072. The touch panel 5071, also known as a touch screen, may collect a touch operation of a user thereon or thereby (for example, an operation in or around the touch panel 5071 that is made by a user with a finger, a touch pen or any other suitable object or accessory). The touch panel 5071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 510. The touch controller may receive a command from the processor 510 and executes the command. In addition, the touch panel 5071 may be implemented by various types such as a resistive panel, a capacitive panel, an infrared panel, or a surface acoustic wave panel. In addition to the touch panel 5071, the user input unit 507 may include other input device 5072. Specifically, the other input device 5072 may include, but is not limited to, a physical keyboard, a function key (such as a volume control key, a switch key), a trackball, a mouse, or a joystick, which are not described herein.

Further, the display panel 5061 may be covered by the touch panel 5071. When the touch panel 5071 detects a touch operation in or near the touch panel 5071, the touch panel 5071 transmits the touch operation to the processor 510 to determine the type of the touch event, and the processor 510 provides a corresponding visual output in the display panel 5061 according to the type of touch event. Although the touch panel 5071 and the display panel 5061 are implemented as two independent components to implement the input and output functions of the mobile terminal in FIG. 5, in some embodiments, the touch panel 5071 and the display panel 5061 may be integrated to implement the input and output functions of the mobile terminal, which are not limited herein.

The interface unit 508 is an interface through which an external device is connected to the mobile terminal 500. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 508 may be configured to receive input (e.g., data information, power, etc.) from an external device and transmit the received input to one or more elements in the mobile terminal 500 or may be configured to transmit data between the mobile terminal 500 and the external device.

The memory 509 may be configured to store software programs and various data. The memory 509 may mainly include a program storage region and a data storage region, where the program storage region may store an operating system, an application (such as a sound playback function, an image playback function, etc.) required for at least one function; the data storage region may store data (such as audio data, a phone book, etc.) created according to the use of the mobile phone. In addition, the memory 509 may include a high-speed random access memory, and may further include a non-volatile memory, such as at least one magnetic disk storage device, a flash memory device, or other volatile solid-state storage device.

The processor 510 is a control center of the mobile terminal, which uses various interfaces and lines to connect various parts of the entire mobile terminal. The processor 510 runs or executes software programs and/or modules stored in the memory 509 and calls data stored in the memory 509, to execute various functions of the mobile terminal and process data, so as to monitor the mobile terminal as a whole. The processor 510 may include one or more processing units. Optionally, the processor 510 may integrate an application processor and a modem processor. The application processor mainly processes an operating system, a user interface, an application, etc., and the modem processor mainly processes wireless communications. It can be understood that the foregoing modem processor may not be integrated into the processor 510.

The mobile terminal 500 may further include a power supply 511 (such as a battery) for supplying power to various components. Optionally, the power supply 511 may be logically connected to the processor 510 through a power management system, so as to implement functions, such as management of charging and discharging, and power consumption management, via the power management system.

In addition, the mobile terminal 500 may include some functional modules that are not shown, which are not described herein.

Optionally, embodiments of the present disclosure further provide a mobile terminal, including a processor 510, a memory 509, and a computer program stored in the memory 509 and executable by the processor 510, the computer program, when being executed by the processor 510, performs the various processes of the above method embodiments for display control, and the same technical effects can be achieved, which is not repeated herein so as to avoid repetition.

Embodiments of the present disclosure further provide a computer readable storage medium. A computer program is stored in the computer readable storage medium. The computer program, when being executed by a processor, performs the various processes of the embodiments of the above method for display control, which can achieve the same technical effects. To avoid repetition, details are not described herein. The computer readable storage medium is, for example, a read-only memory (ROM), a random access memory (RAM), a magnetic disk or an optical disk.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments may be implemented by means of software plus a necessary universal hardware platform, and also may be implemented by hardware, but in many cases the former is preferred. Based on this understanding, the technical solution of the present disclosure that is essential or contributes to the related technologies may be embodied in the form of a software product that is stored in a storage medium (such as a ROM/RAM, a magnetic disk, or an optical disc), which includes several instructions for enabling a mobile terminal (which may be a mobile phone, a computer, a server, an air conditioner, or a network device) to execute the method described in the embodiments of the present disclosure.

The embodiments of the present disclosure are described in the above with reference to the drawings, and the present disclosure is not limited to the above specific implementations. The above specific implementations are illustrative rather than restrictive. Various forms can be made by those of ordinary skill in the art under the inspiration of the present disclosure, without departing from the purpose of the present disclosure and the protection scope of the claims, all of which fall within the protection of the present disclosure.

What is claimed is:

1. A method for display control, applied to a mobile terminal, comprising:
   receiving a first operation inputted by a user; and
   displaying, in a third screen region, an icon corresponding to a notification message, content of a notification message, or an application icon of at least one target application, in response to the first operation;
   wherein the third screen region is a bending region between a first screen region and a second screen region of a flexible screen of the mobile terminal, or the third screen region is a region between a first screen region and a second screen region of the mobile terminal that are obtained from split-screen display;
   wherein the displaying in the third screen region, the icon corresponding to the notification message, the content of the notification message, or the application icon of the at least one target application in response to the first operation comprises:
      displaying in the third screen region the application icon of the at least one target application in response to the first operation;
   wherein the displaying in the third screen region the application icon of the at least one target application in response to the first operation comprises:
      displaying in the third screen region in response to the first operation, an application icon of at least one application which is running in the background, an application icon of at least one application whose duration of running in the foreground is longer than a preset duration, and an application icon of at least one application whose number of running in the foreground is greater than a preset number of threshold.

2. The method according to claim 1, wherein the receiving the first operation inputted by the user comprises:
receiving the first operation inputted by the user, wherein the first operation indicates performing display in the first screen region and/or the second screen region.

3. The method according to claim 1, further comprising:
displaying terminal information in the third screen region in response to the first operation, wherein the terminal information comprises at least one of: remaining power information, signal strength information, or time information.

4. The method according to claim 1, wherein after the displaying in the third screen region the application icon of the at least one target application, the method further comprises:
detecting a second operation on a first target application icon which is displayed in the third screen region inputted by the user;
detecting whether a running interface of an application is displayed in a target screen region, in a case that it is detected that the user drags the first target application icon into the target screen region;
displaying, in the target screen region, a target running interface of an application corresponding to the first target application icon, in a case that it is detected that the running interface of the application is not displayed in the target screen region; and
closing the running interface, displaying in the third screen region an application icon of the application corresponding to the running interface, and displaying in the target screen region the target running interface of the application corresponding to the first target application icon, in a case that it is detected that the running interface of the application is displayed in the target screen region;
wherein the target screen region is the first screen region or the second screen region.

5. The method according to claim 1, wherein after the displaying in the third screen region the application icon of the at least one target application, the method further comprises:
detecting a third operation on a second target application icon which is displayed in the third screen region inputted by the user; and
closing an application corresponding to the second target application icon, in a case that it is detected that a speed at which the user drags the second target application icon or a direction in which the user drags the second target application icon meets a preset condition.

6. The method according to claim 1, wherein after the displaying in the third screen region the application icon of the at least one target application, the method further comprises:
receiving a sliding operation in a preset direction at a preset speed which is inputted by the user in the third screen region; and
closing an application corresponding to the application icon displayed in the third screen region, according to the sliding operation.

7. A mobile terminal, comprising a processor, a memory, and a program stored in the memory and executable by the processor, wherein the program, when being executed by the processor, configures the processor to:
receive a first operation inputted by a user; and
display, in a third screen region, an icon corresponding to a notification message, content of a notification message, or an application icon of at least one target application, in response to the first operation;
wherein the third screen region is a bending region between a first screen region and a second screen region of a flexible screen of the mobile terminal, or the third screen region is a region between a first screen region and a second screen region of the mobile terminal that are obtained from split-screen display;
wherein the processor is configured to:
display in the third screen region in response to the first operation, an application icon of at least one application which is running in the background, an application icon of at least one application whose duration of running in the foreground is longer than a preset duration, and an application icon of at least one application whose number of running in the foreground is greater than a preset number of threshold.

8. The mobile terminal according to claim 7, wherein the processor is configured to receive the first operation inputted by the user, wherein the first operation indicates performing display in the first screen region and/or the second screen region.

9. The mobile terminal according to claim 7, wherein the processor is configured to:
display terminal information in the third screen region in response to the first operation, wherein the terminal information comprises at least one of: remaining power information, signal strength information, or time information.

10. The mobile terminal according to claim 7, wherein the processor is configured to:
detect a second operation on a first target application icon which is displayed in the third screen region inputted by the user;
detect whether a running interface of an application is displayed in a target screen region, in a case that it is detected that the user drags the first target application icon into the target screen region;
display, in the target screen region, a target running interface of an application corresponding to the first target application icon, in a case that it is detected that the running interface of the application is not displayed in the target screen region; and
close the running interface, display in the third screen region an application icon of the application corresponding to the running interface, and display in the target screen region the target running interface of the application corresponding to the first target application icon, in a case that it is detected that the running interface of the application is displayed in the target screen region;
wherein the target screen region is the first screen region or the second screen region.

11. The mobile terminal according to claim 7, wherein the processor is configured to:
detect a third operation on a second target application icon which is displayed in the third screen region inputted by the user; and
close an application corresponding to the second target application icon, in a case that it is detected that a speed at which the user drags the second target application icon or a direction in which the user drags the second target application icon meets a preset condition.

12. The mobile terminal according to claim 7, wherein the processor is configured to:
receive a sliding operation in a preset direction at a preset speed which is inputted by the user in the third screen region; and
close an application corresponding to the application icon displayed in the third screen region, according to the sliding operation.

13. A non-transitory computer readable storage medium, having a program stored thereon, wherein the program, when being executed by a processor, performs the following steps:
receiving a first operation inputted by a user; and
displaying, in a third screen region, an icon corresponding to a notification message, content of a notification message, or an application icon of at least one target application, in response to the first operation;
wherein the third screen region is a bending region between a first screen region and a second screen region of a flexible screen of a mobile terminal, or the third screen region is a region between a first screen region and a second screen region of a mobile terminal that are obtained from split-screen display;
wherein the displaying in the third screen region, the icon corresponding to the notification message, the content of the notification message, or the application icon of the at least one target application in response to the first operation comprises:
displaying in the third screen region the application icon of the at least one target application in response to the first operation;
wherein the displaying in the third screen region the application icon of the at least one target application in response to the first operation comprises:
displaying in the third screen region in response to the first operation, an application icon of at least one application which is running in the background, an application icon of at least one application whose duration of running in the foreground is longer than a preset duration, and an application icon of at least one application whose number of running in the foreground is greater than a preset number of threshold.

14. The non-transitory computer readable storage medium according to claim 13, wherein the receiving the first operation inputted by the user comprises:
receiving the first operation inputted by the user, wherein the first operation indicates performing display in the first screen region and/or the second screen region.

15. The non-transitory computer readable storage medium according to claim 13, wherein the program, when being executed by the processor, performs the following steps:
displaying terminal information in the third screen region in response to the first operation, wherein the terminal information comprises at least one of: remaining power information, signal strength information, or time information.

16. The non-transitory computer readable storage medium according to claim 13, wherein after the displaying in the third screen region the application icon of the at least one target application, the program, when being executed by the processor, performs the following steps:
detecting a second operation on a first target application icon which is displayed in the third screen region inputted by the user;
detecting whether a running interface of an application is displayed in a target screen region, in a case that it is detected that the user drags the first target application icon into the target screen region;
displaying, in the target screen region, a target running interface of an application corresponding to the first target application icon, in a case that it is detected that the running interface of the application is not displayed in the target screen region; and
closing the running interface, displaying in the third screen region an application icon of the application corresponding to the running interface, and displaying in the target screen region the target running interface of the application corresponding to the first target application icon, in a case that it is detected that the running interface of the application is displayed in the target screen region;
wherein the target screen region is the first screen region or the second screen region.

17. The non-transitory computer readable storage medium according to claim 13, wherein after the displaying in the third screen region the application icon of the at least one target application, the program, when being executed by the processor, performs the following steps:
detecting a third operation on a second target application icon which is displayed in the third screen region inputted by the user; and
closing an application corresponding to the second target application icon, in a case that it is detected that a speed at which the user drags the second target application icon or a direction in which the user drags the second target application icon meets a preset condition.

18. The non-transitory computer readable storage medium according to claim 13, wherein after the displaying in the third screen region the application icon of the at least one target application, the program, when being executed by the processor, performs the following steps:
receiving a sliding operation in a preset direction at a preset speed which is inputted by the user in the third screen region; and
closing an application corresponding to the application icon displayed in the third screen region, according to the sliding operation.

* * * * *